(12) United States Patent
Shinohara et al.

(10) Patent No.: US 11,284,032 B2
(45) Date of Patent: Mar. 22, 2022

(54) IMAGING DEVICE, SEMICONDUCTOR DEVICE AND CAMERA

(71) Applicant: CANON KABUSHIKI KAISHA, Tokyo (JP)

(72) Inventors: Masahito Shinohara, Tokyo (JP); Tomoya Kumagai, Tokyo (JP); Takanori Yamashita, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/433,088

(22) Filed: Jun. 6, 2019

(65) Prior Publication Data

US 2019/0379850 A1 Dec. 12, 2019

(30) Foreign Application Priority Data

Jun. 11, 2018 (JP) .............................. JP2018-111247

(51) Int. Cl.
*H04N 5/378* (2011.01)
*H04N 5/369* (2011.01)
*H04N 5/357* (2011.01)
*H04N 5/376* (2011.01)

(52) U.S. Cl.
CPC ............ *H04N 5/378* (2013.01); *H04N 5/357* (2013.01); *H04N 5/379* (2018.08); *H04N 5/3765* (2013.01)

(58) Field of Classification Search
None
See application file for complete search history.

(56) References Cited

U.S. PATENT DOCUMENTS

| 7,394,492 | B2 | 7/2008 | Shinohara | |
| 7,903,056 | B2 | 3/2011 | Kawasaki et al. | |
| 9,019,141 | B2 | 4/2015 | Hashimoto et al. | |
| 9,749,570 | B2 | 8/2017 | Yamashita et al. | |
| 2009/0167915 | A1* | 7/2009 | Hirota | H04N 5/357 348/302 |
| 2012/0327279 | A1* | 12/2012 | Hashimoto | H03M 1/56 348/300 |
| 2013/0206961 | A1* | 8/2013 | Ikeda | H01L 27/14601 250/208.1 |

(Continued)

FOREIGN PATENT DOCUMENTS

JP 2006-203929 A 8/2006
JP 2013-009087 A 1/2013

*Primary Examiner* — Twyler L Haskins
*Assistant Examiner* — Wesley J Chiu
(74) *Attorney, Agent, or Firm* — Venable LLP (57) ABSTRACT

An imaging device includes a pixel circuit configured to generate an analog signal; an amplification circuit including a feedback capacitor and its reset switching element; a sample and hold circuit for the amplified analog signal; an A/D conversion circuit for the analog signal held in the sample and hold circuit; a memory circuit configured to store the digital signal; a reading circuit configured to read the digital signal stored in the memory circuit; and a control circuit configured to perform a rise and a fall of the control signal such that the rise and the fall do not overlap a conversion period of the analog signal by the A/D conversion circuit and do not overlap a reading period of the digital signal by the reading circuit, when the switching element is off during a sampling period of the analog signal.

8 Claims, 6 Drawing Sheets

(56) References Cited

U.S. PATENT DOCUMENTS

| | | | | |
|---|---|---|---|---|
| 2013/0258132 A1* | 10/2013 | Hashimoto | ............ | H03M 1/06 |
| | | | | 348/222.1 |
| 2013/0271633 A1* | 10/2013 | Hashimoto | ............ | H04N 5/353 |
| | | | | 348/300 |
| 2014/0184865 A1* | 7/2014 | Muto | ................. | H04N 5/378 |
| | | | | 348/300 |
| 2015/0296163 A1* | 10/2015 | Nakamura | ............ | H04N 5/378 |
| | | | | 348/308 |
| 2016/0127669 A1* | 5/2016 | Yamazaki | ............ | H04N 5/3765 |
| | | | | 348/300 |
| 2017/0155865 A1* | 6/2017 | Nakajima | ............ | H04N 5/374 |
| 2019/0098231 A1 | 3/2019 | Iwata et al. | | |

* cited by examiner

IMAGING DEVICE, SEMICONDUCTOR DEVICE AND CAMERA

BACKGROUND OF THE INVENTION

Field of the Invention

The present invention relates to an imaging device, a semiconductor device, and a camera.

Description of the Related Art

In recent years, there have been cameras in which a CMOS image sensor is used as an imaging device and which performs analog-to-digital (A/D) conversion of a pixel signal in the imaging device. As one type of technique of A/D conversion in an imaging device, a technique is known in which a comparator compares a pixel signal with a reference signal (e.g., a ramp signal) that changes with time, and acquires a digital signal in accordance with a change in the output of the comparator (Japanese Patent Laid-Open No. 2013-9087). Further, a technique is known in which a sample and hold (S/H) circuit is provided between a comparator and a preceding circuit so that the operation of the preceding circuit can be started in parallel with the A/D conversion for the purpose of achieving a speedup (Japanese Patent Laid-Open No. 2006-203929).

SUMMARY OF THE INVENTION

During A/D conversion, the value of the analog signal (e.g., a pixel signal) being subjected to the conversion is maintained at a constant value. However, when a control pulse is generated during the A/D conversion period, the values of the reference signal and/or the analog signal being subjected to the conversion may vary, thus reducing the accuracy of the A/D conversion. The digital signal after the A/D conversion is stored in a memory circuit in the imaging device. The control signal may affect the reading of that digital signal to the outside of the imaging device. As a result, the image quality obtained with the imaging device is reduced. An aspect of the present invention provides a technique of improving the image quality obtained with an imaging device including an A/D converter.

According to an embodiment, an imaging device, comprising: a pixel circuit configured to generate an analog signal in accordance with a quantity of incident light; an amplification circuit including a feedback capacitor and a switching element for resetting the feedback capacitor, the amplification circuit being configured to amplify the analog signal generated in the pixel circuit; a sample and hold circuit configured to perform sampling and holding of the analog signal amplified by the amplification circuit; an A/D conversion circuit configured to convert the analog signal held in the sample and hold circuit to a digital signal; a memory circuit configured to store the digital signal; a reading circuit configured to read the digital signal stored in the memory circuit; and a control circuit configured to generate a control signal for controlling on/off of the switching element, wherein the control circuit performs rise and fall of the control signal such that the rise and the fall do not overlap a conversion period of the analog signal by the A/D conversion circuit and do not overlap a reading period of the digital signal by the reading circuit, when the switching element is off during a sampling period of the analog signal, is provided.

Further features of the present invention will become apparent from the following description of exemplary embodiments with reference to the attached drawings.

DESCRIPTION OF THE EMBODIMENTS

Embodiments of the invention are described below with reference to the drawings. Like elements are denoted with the same reference numerals throughout the various embodiments, and redundant descriptions thereof are omitted. Further, the embodiments may be modified and/or combined as appropriate.

Figure 1:
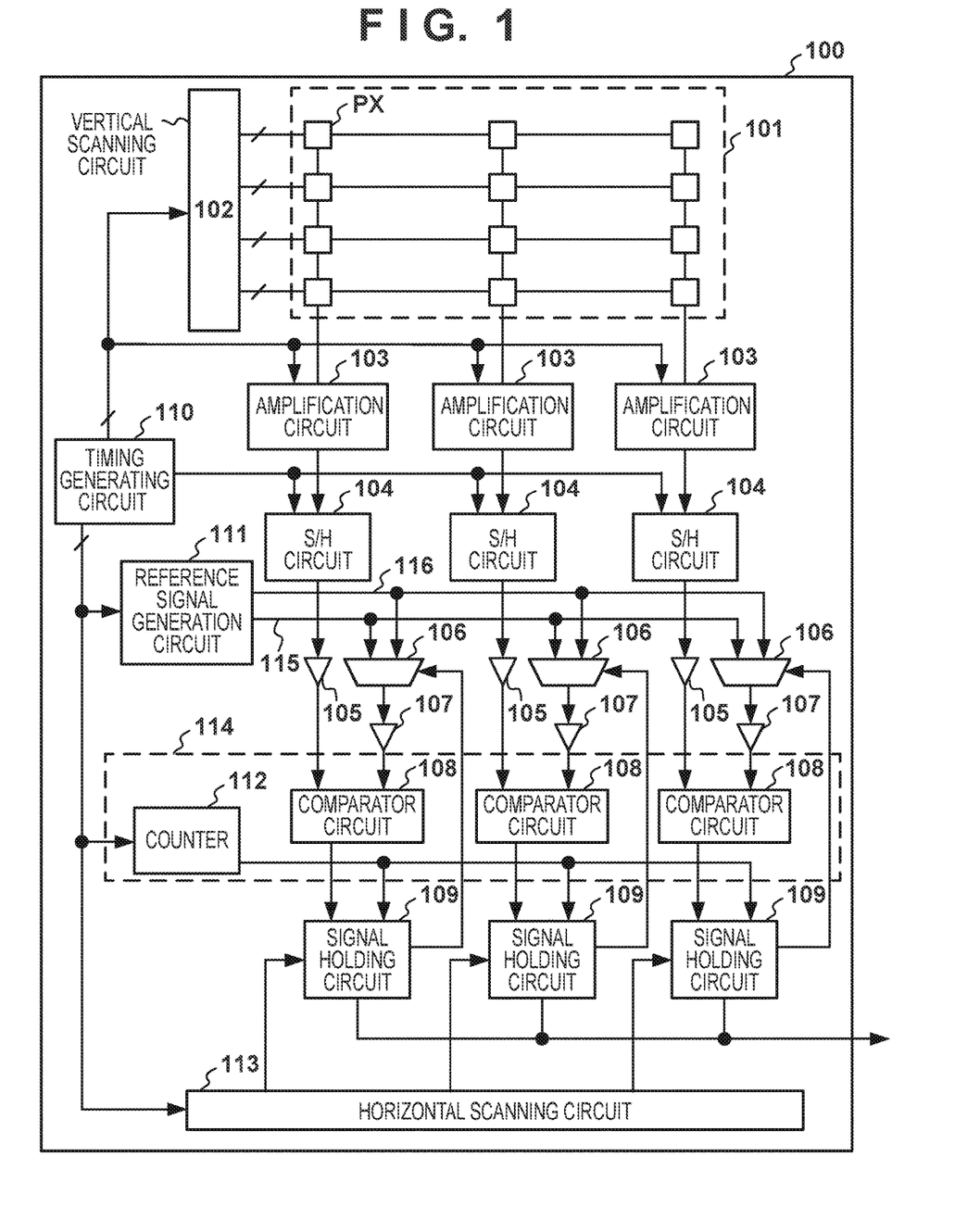
FIG. 1 is a diagram illustrating an exemplary overall configuration of an imaging device of some embodiments.

An overall configuration of an imaging device 100 according to some embodiments is described with reference to FIG. 1. The imaging device 100 includes the components illustrated in FIG. 1. A pixel array 101 is composed of a plurality of pixel circuits PX arranged in a matrix. Each of the pixel circuits PX generates an analog signal in accordance with the quantity of incident light. A vertical scanning circuit 102 sequentially selects each row of the pixel array 101. Analog signals for each pixel circuit PX included in the selected row are read to an amplification circuit 103 corresponding to each column of the pixel array 101.

The amplification circuit 103 amplifies the analog signal read from the pixel circuit PX by a predetermined gain and supplies the amplified signal to a sample and hold circuit 104 (S/H circuit in the figure). The sample and hold circuit 104 serves as a holding circuit that holds the supplied analog signal. Specifically, the sample and hold circuit 104 performs sampling of the analog signal and holding of the analog signal. The output signal from the sample and hold circuit 104 is supplied to a comparator circuit 108 via a buffer circuit 105. The buffer circuit 105 is composed of a source follower circuit, for example. The buffer circuit 105 performs impedance conversion on the signal input to the buffer circuit 105. As a result, potential variations in the input to the comparator circuit 108 are suppressed. The same applies to the following buffer circuit 107.

A reference signal generation circuit 111 generates a reference signal that changes with time. As an example of such a reference signal, a ramp signal is described below. The ramp signal is a signal that changes (increases in this embodiment) in a constant ratio with time. The reference signal generation circuit 111 generates two types of ramp signals, RAMP_H and RAMP_L. The time change rate of the ramp signal RAMP_H is higher than the time change rate of the ramp signal RAMP_L. The reference signal generation circuit 111 supplies the ramp signal RAMP_L to a selector 106 through a signal line 115 and supplies the ramp signal RAMP_H to the selector 106 through a signal line 116.

The selector 106 selects and outputs one of the supplied ramp signals RAMP_H and RAMP_L. The output of the selector 106 is supplied to the comparator circuit 108 via the buffer circuit 107. The comparator circuit 108 compares the value relationship between the input from the buffer circuit 105 and the input from the buffer circuit 107, and outputs a signal of a level corresponding to a result of comparison.

A counter 112 provides an increasing count value to a signal holding circuit 109 while a control signal φEN is high (i.e., enable period). The signal holding circuit 109 includes a memory circuit, and stores, in the memory circuit, a count value obtained at the time point when the value of the output of the comparator circuit 108 is switched. Thus, an A/D conversion circuit 114 is composed of a combination of the counter 112 and the comparator circuit 108. The A/D conversion circuit converts the analog signal held in the sample and hold circuit 104 into a digital signal. The memory circuit of the signal holding circuit 109 stores this digital signal.

A horizontal scanning circuit 113 sequentially selects a plurality of the signal holding circuits 109, and switches, to high, a control signal φHT to be supplied to the selected signal holding circuit 109. Accordingly, the digital signal stored in the memory circuit is read and output to the outside of the imaging device 100. A timing generating circuit 110 controls the operation by generating and supplying control signals to each circuit of the imaging device 100. As such, the timing generating circuit 110 may be referred to as a control circuit.

Figure 2:
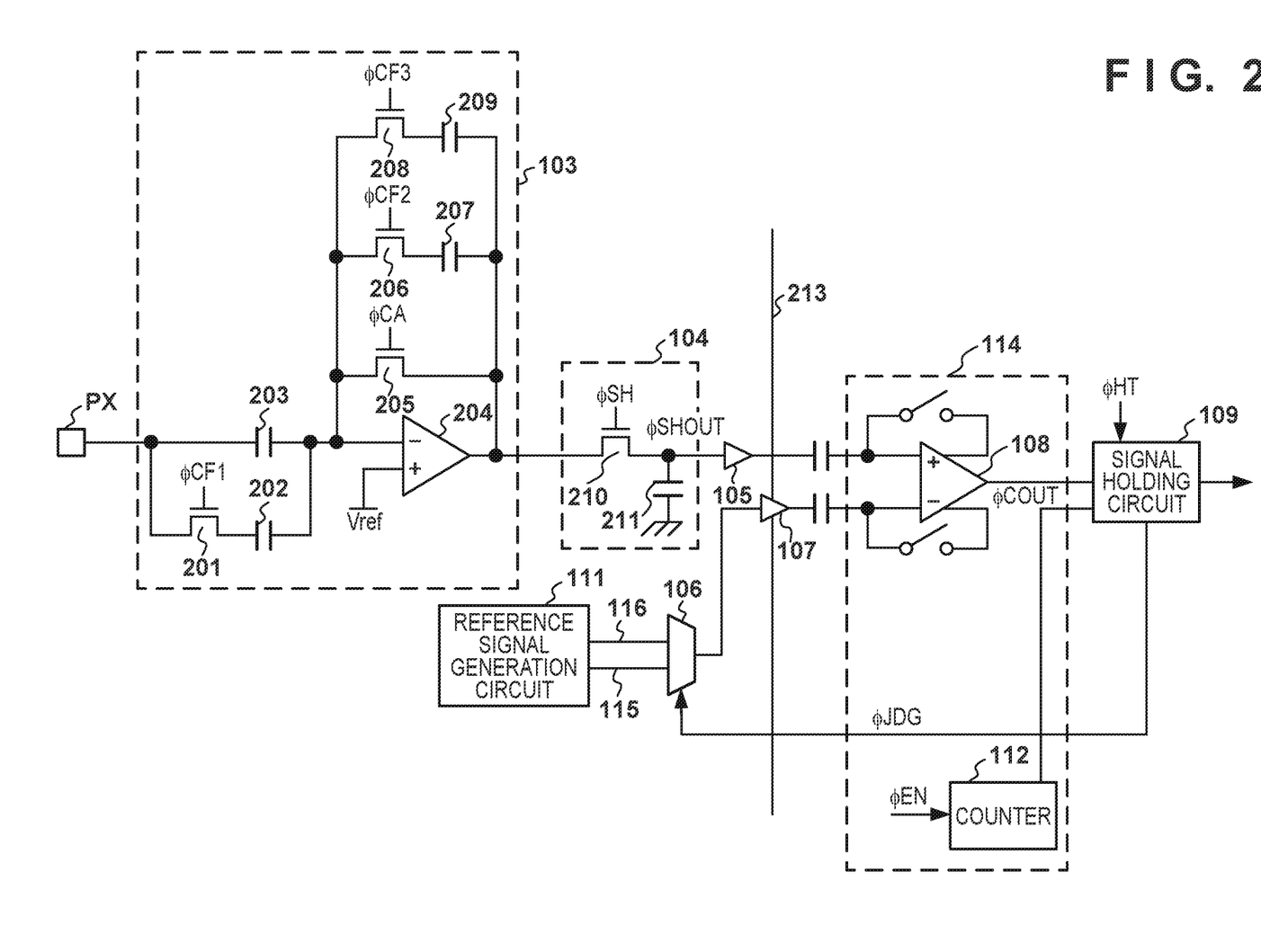
FIG. 2 is a diagram illustrating an exemplary circuit configuration of the imaging device of some embodiments.

An exemplary specific circuit configuration of the amplification circuit 103, the sample and hold circuit 104, and the A/D conversion circuit 114 included in the imaging device 100 is described below with reference to FIG. 2. The circuit configuration of the pixel circuit PX may be an existing configuration, and therefore detailed descriptions thereof are omitted. The pixel circuit PX includes, for example, a photoelectric conversion element that converts incident light into charge, a floating diffusion (FD) that converts charge to a voltage, and a transfer transistor that transfers charge from the photoelectric conversion element to the FD. The pixel circuit PX further includes an amplification transistor that constitutes a source follower for amplifying and reading a voltage of the FD, a selection transistor for selecting a pixel to read a signal to the signal line, and a reset transistor for resetting the potential of the FD.

The amplification circuit 103 includes an operational amplifier 204, capacitors 202, 203, 207 and 209, and transistors 201, 205, 206 and 208. The analog signal from the pixel circuit PX is supplied to an inverting input terminal of the operational amplifier 204 via the capacitor 203. The transistor 201 and the capacitor 202 are connected in series between both ends of the capacitor 203. The transistor 205 is connected between the output terminal and the inverting input terminal of the operational amplifier 204. The transistor 206 and the capacitor 207 are connected in series between the output terminal and the inverting input terminal of the operational amplifier 204. Further, the transistor 208 and the capacitor 209 are connected in series between the output terminal and the inverting input terminal of the operational amplifier 204. The capacitors 202 and 203 may be referred to as input capacitors because they receive an input signal from the pixel circuit PX. The capacitors 207 and 209 may be referred to as feedback capacitors because they are used for feedback of the output of the operational amplifier 204. A voltage Vref is supplied to the non-inverting input terminal of the operational amplifier 204.

Each of the transistors 201, 205, 206 and 208 are MOS transistors, for example. A control signal φCF1 is supplied to the control terminal of the transistor 201 from the timing generating circuit 110. The level of control signal φCF1 controls on and off of the transistor 201. In this manner, the transistor 201 functions as a switching element. In the following example, when the control signal φCF1 is low, the transistor 201 is set to off (the switching element is open), and when the control signal φCF1 is high, the transistor 201 is set to on (the switching element is closed). Likewise, the transistors 205, 206 and 208 are turned on/off by control signals φCA, φCF2 and φCF3, respectively. The gain of the amplification circuit 103 is adjusted by switching between on and off of each of the transistors 201, 206 and 208. Although the transistors 201, 205, 206 and 208 for the switch are illustrated as an NMOS type in FIG. 2, the transistors 201, 205, 206 and 208 may be a complementary switching element composed of a combination of an NMOS transistor and a PMOS transistor.

The sample and hold circuit 104 includes a transistor 210 and a capacitor 211. The transistor 210 is connected between the amplification circuit 103 and the buffer circuit 105. One terminal of the capacitor 211 is connected to a node between the transistor 210 and the buffer circuit 105. The analog signal output from the sample and hold circuit 104 is represented by φSHOUT. A control signal φSH is supplied to the control terminal of the transistor 210 from the timing generating circuit 110. The level of the control signal φSH controls on and off of the transistor 210. In this manner, the transistor 210 functions as a switching element. In the following example, when the control signal φSH is low, the transistor 210 is set to off (the switching element is open), and when the control signal φSH is high, the transistor 210 is set to on (the switching element is closed). While the transistor 210 is on, the sample and hold circuit 104 is in a sampling state during which the output signal from the amplification circuit 103 is written to the capacitor 211. While the transistor 210 is off, the sample and hold circuit 104 is in a hold state during which the signal of the capacitor 211 is held. Although the transistor 210 for the switch is illustrated as an NMOS type in FIG. 2, the transistor 210 may be a complementary switching element composed of a combination of an NMOS transistor and a PMOS transistor.

The comparator circuit 108 compares the levels of the signal supplied to the non-inverting input terminal and the signal supplied to the inverting input terminal. The comparator circuit 108 outputs a high when the signal supplied to the non-inverting input terminal is larger, and outputs a low when the signal supplied to the inverting input terminal is larger. The output of the comparator circuit 108 is represented by φCOUT.

Figure 3:
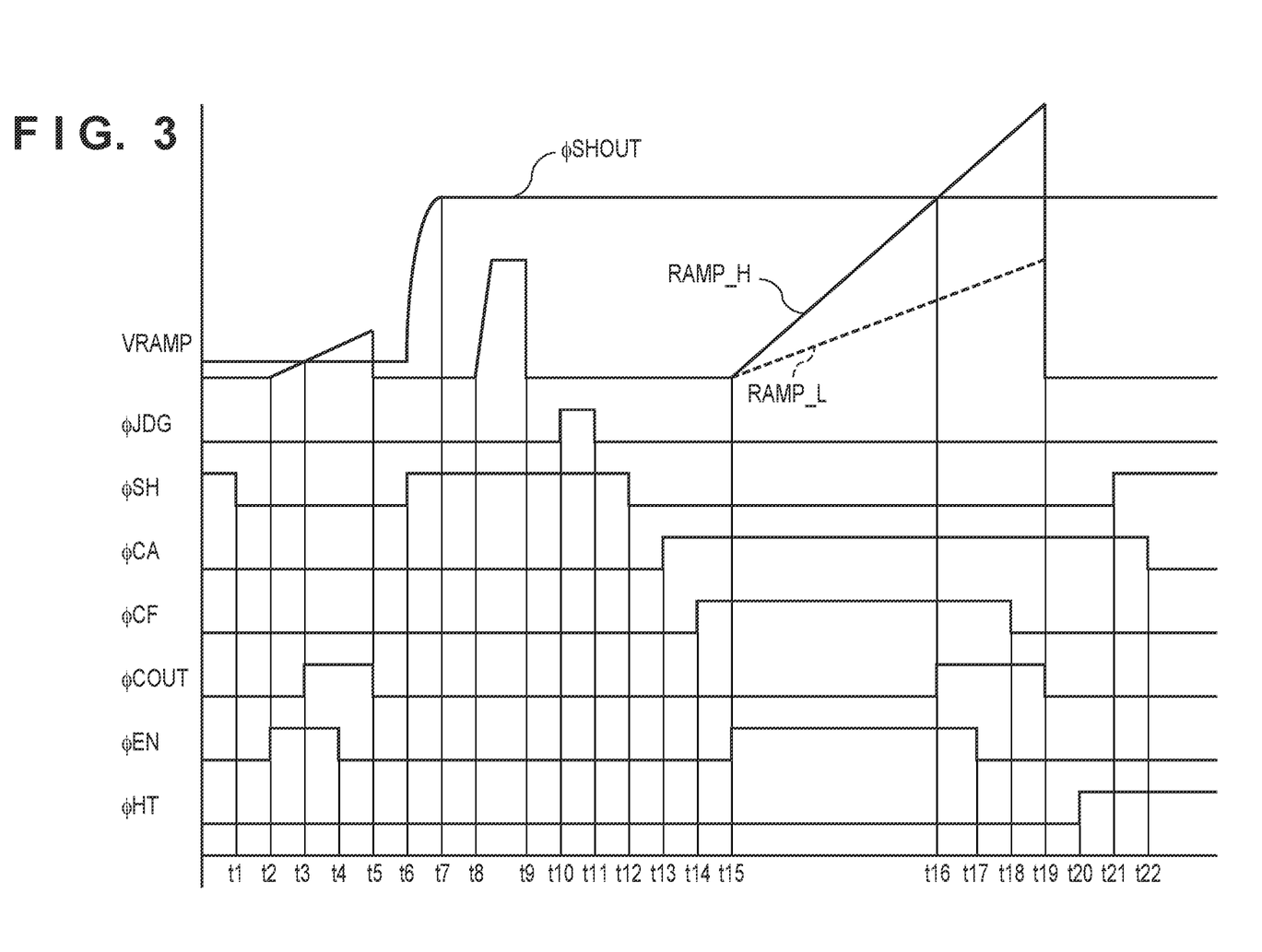
FIG. 3 is a diagram illustrating exemplary operations performed by the imaging device of some embodiments.

An exemplary operation of the imaging device 100 is described below with reference to the timing diagram of FIG. 3. VRAMP represents a voltage output from the selector 106. In FIG. 3, for purposes of illustration, VRAMP and φSHOUT are overlapped with each other. In the following example, the timing generating circuit 110 controls the control signals φCF1, φCF2 and φCF3 at the same timing. As such, the control signals φCF1, φCF2 and φCF3 are collectively represented by φCF. The timing generating circuit 110 may individually control the control signals φCF1, φCF2 and φCF3 to adjust the gain of the amplification circuit 103.

In the following example, a noise signal is read from each pixel circuit PX of the pixel array 101 to the amplification circuit 103 and thereafter the pixel signal is read. The noise signal is a signal that is generated by the pixel circuit PX in the state where there is no incident light. The pixel signal is a signal that is generated by the pixel circuit PX in the state where there is incident light. Each of the noise signal and the pixel signal is an analog signal. An existing method may be used as a method for reading a noise signal and a pixel signal from the pixel circuit PX, and therefore detailed descriptions are thereof omitted.

It is assumed that before time t1, a noise signal has been read from the pixel circuit PX. At this point, the control signal φSH is high, and accordingly the transistor 210 is on, i.e., the sample and hold circuit 104 is in a sampling state. Thus, the noise signal is amplified by the amplification circuit 103 and the amplified signal is sampled by the sample and hold circuit 104. The output φSHOUT of the sample and hold circuit 104 represents the noise signal. Since control signals φCA and φCF are low, each of the transistors 201, 205, 206 and 208 is off. In other words, none of the capacitors 202, 207 and 209 is used for amplification of the noise signal.

At time t1, the timing generating circuit 110 switches the control signal φSH from high to low. Accordingly, the noise signal is held in the capacitor 211 of the sample and hold circuit 104.

At time t2, the timing generating circuit 110 switches the control signal φEN from low to high. This causes the counter 112 to start counting and supply the count value to the signal holding circuit 109. At time t2, the reference signal generation circuit 111 starts a time-dependent change (i.e., increasing) of the ramp signal RAMP_L. At this point, the control signal JDG is low, hence the selector 106 provides an input from the signal line 115, i.e., the ramp signal RAMP_L, to the buffer circuit 107.

At time t3, when the value of the ramp signal RAMP_L exceeds φSHOUT, the output of the comparator circuit 108 is reversed from low to high. In response, the signal holding circuit 109 stores the count value at that point in the memory circuit as a digital signal of the noise signal.

At time t4, the timing generating circuit 110 switches the control signal φEN from high to low. In this manner, the counter 112 terminates the count. At time t5, the reference signal generation circuit 111 terminates the time-dependent change (i.e., increasing) of the ramp signal RAMP_L and resets the value to the initial value. In response, the output of the comparator circuit 108 is also reset to low.

Between times t5 and t6, the timing generating circuit 110 reads the pixel signal from pixel circuit PX by controlling the vertical scanning circuit 102. This pixel signal is supplied to the amplification circuit 103.

At time t6, the timing generating circuit 110 switches the control signal φSH from low to high. In response to this, the sample and hold circuit 104 is set to a sampling state, and the φSHOUT represents the amplified pixel signal at time t7.

At time t8, reference signal generation circuit 111 supplies a threshold voltage to the signal line 115. Since the selector 106 has selected the signal from the signal line 115, the threshold voltage is supplied to the inverting input terminal of the comparator circuit 108 via the buffer circuit 107. The threshold voltage is a value used for comparison with the pixel signal. When the pixel signal is greater than the threshold voltage (i.e., when the φCOUT is low), A/D conversion of the pixel signal is performed using the ramp signal RAMP_H in the subsequent processing. When the pixel signal is equal to or smaller than the threshold voltage (i.e., when the φCOUT is high), A/D conversion of the pixel signal is performed using the ramp signal RAMP_L in the subsequent processing. FIG. 3 illustrates a case where the φCOUT is low. In this manner, the signal holding circuit 109 serves as a determination circuit that generates a pulse for switching the time change rate of the ramp signal used by the A/D conversion circuit 114 in accordance with a result of comparison between the threshold and the value of the signal output by the sample and hold circuit 104 during the sampling period. At time t9, the reference signal generation circuit 111 resets, to the initial value, the signal to be supplied to the signal line 115.

The signal holding circuit 109 raises the pulse of the control signal φJDG at time t10 and lowers the pulse of the control signal φJDG at time t11. In response to this pulse, the selector 106 switches the signal to be output, from the input from the signal line 115 to the input from the signal line 116.

At time t12, the timing generating circuit 110 switches the control signal φSH from high to low. As a result, the pixel signal is held in the capacitor 211 of the sample and hold circuit 104. At time t13, the timing generating circuit 110 switches the control signal φCA from low to high. As a result, the transistor 205 is turned on and the operational amplifier 204 is reset. At time t14, the timing generating circuit 110 switches the control signal φCF from low to high. As a result, each of the transistors 201, 206 and 208 is turned on, and each of the capacitors 202, 207 and 209 is reset.

At time t15, the timing generating circuit 110 switches the control signal φEN from low to high. This causes the counter 112 to start counting and supply the count value to the signal holding circuit 109. At time t15, the reference signal generation circuit 111 starts time-dependent change (i.e., increasing) of the ramp signal RAMP_H. Since the pulse of the control signal φJDG has been supplied, the selector 106 provides, to the buffer circuit 107, the input from the signal line 116, i.e., the ramp signal RAMP_H. On the other hand, as the dashed line indicates in FIG. 3, when the pulse of the control signal φJDG is not provided, the selector 106 provides, to the buffer circuit 107, the input from the signal line 115, i.e., the ramp signal RAMP_L.

At time t16, when the value of the ramp signal RAMP_H exceeds φSHOUT, the output of the comparator circuit 108 is reversed from low to high. In response to this, the signal holding circuit 109 stores the count value at that point in the memory circuit as a digital signal of the pixel signal.

At time t17, the timing generating circuit 110 switches the control signal φEN from high to low. In this manner, the counter 112 terminates the count. At time t18, the timing generating circuit 110 lowers the control signal φCF from high to low. This turns off the transistors 201, 206 and 208, and the reset state of the capacitors 202, 207 and 209 is released.

At time t19, the reference signal generation circuit 111 terminates the time-dependent change (i.e., increasing) of the ramp signal RAMP_H and resets the value to the initial value. In response, the output of the comparator circuit 108 is also reset to low. At time t20, the horizontal scanning circuit 113 raises the control signal φHT from low to high, and starts reading of the pixel signal and the noise signal stored in the signal holding circuit 109. At time t21, the timing generating circuit 110 raises the control signal φSH from low to high. At time t22, the timing generating circuit 110 lowers the control signal φCA from high to low.

In the above-described operation, the transistors 206 and 208 are off during the sampling period of the pixel signal (times t6 to t12). That is, the capacitors 207 and 209 (feedback capacitors) are not used for amplification of the pixel signal. In this case, the timing generating circuit 110 performs the rise (time t14) and the fall (time t18) of the control signal φCF such that the rise and the fall do not overlap the A/D conversion period (times t15 to t17) of the pixel signal. Specifically, the timing generating circuit 110 raises the control signal φCF (time t14) before the A/D conversion period (times t15 to t17) of the pixel signal, and lowers the control signal φCF (time t18) after the A/D conversion period of the pixel signal.

Switching between on and off of the transistors 206 and 208 causes a feedthrough through the sample and hold circuit 104 or the power supply variation. When the control signal φCF is raised and lowered during the A/D conversion period of the pixel signal, the power supply variation or the feedthrough may affect the A/D conversion and consequently an accurate digital signal may not be obtained.

Figure 6:
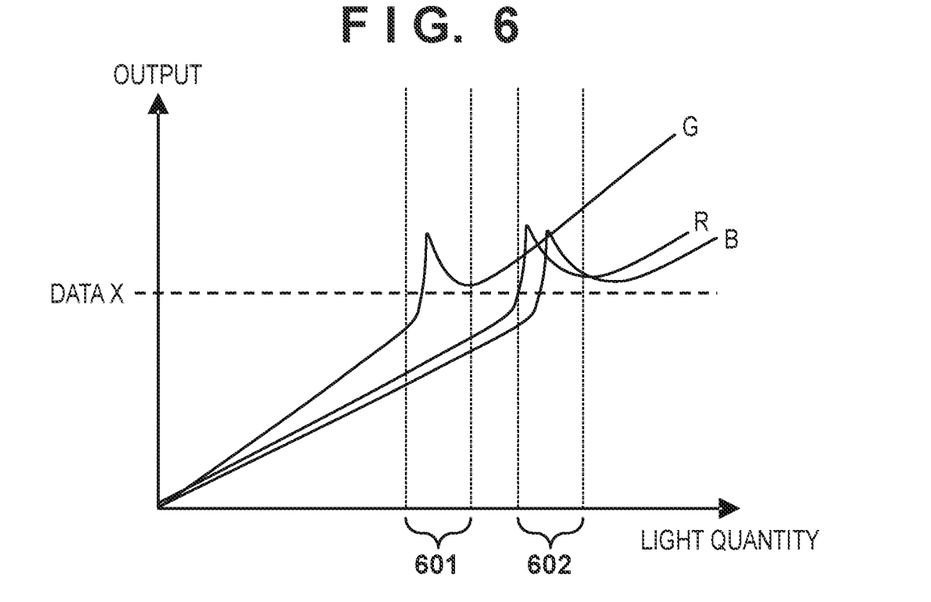
FIG. 6 is a diagram illustrating a case where variations occur in a digital signal.

As illustrated in FIG. 6, when the value of the A/D conversion data in this case is represented by data X, the amount of light that becomes the data X is different among colors R, G and B in the case where the imaging device is a color sensor. Consequently, when light having a light quantity with which any of the colors becomes data X is input into the sensor, the white balance is disrupted and the image is unnaturally colored. For example, in the case of a white light source, the subject is colored green in a light quantity range 601, and the subject is colored magenta in a light quantity range 602.

In the present embodiment, the rise and fall of the control signal φCF are performed such that the rise and fall do not overlap the A/D conversion period of the pixel signal, thus the situation where the power supply variation or feedthrough affects the A/D conversion is suppressed.

Further, the timing generating circuit 110 performs the rise (time t14) and the fall (time t18) of the control signal φCF such that the rise and the fall do not overlap the reading of the digital signal from the signal holding circuit 109 (time t20 or later). Specifically, the timing generating circuit 110 performs the fall of the control signal φCF (time t18) before the start of the reading of the signal from the signal holding circuit 109 (time t20 or later). This also prevents the power supply variation or feedthrough from affecting the reading of the digital signal.

In addition, the pixel signal is held (time t12) after the rise (time t10) and the fall (time t11) of the pulse of the control signal φJDG (times t10 to t11). The pulses of the control signal φJDG affect, by crosstalk noise and the like, the input nodes of the sample and hold circuit 104 in other rows via a bias line 213 of the buffer circuit 107 and the like. As such, when the timing of the generation of the pulse of the control signal φJDG overlaps the hold period of the sample and hold circuit 104, the potential variation of the input node of the comparator circuit 108 may increase, and consequently an accurate digital signal may not be obtained. The present embodiment can suppress such an effect since the pixel signal is held after the rise and the fall of the pulse of the control signal φJDG (time t12).

Additionally, in the configuration of the present embodiment, the buffer circuit 105 is provided between the sample and hold circuit 104 and the comparator circuit 108, and thus potential variations at the input node of the comparator circuit 108 can be suppressed. In this manner, it is possible to reduce the effects of crosstalk noise on other column circuits due to the control signal φJDG.

Thus, according to the present embodiment, degradation in image quality can be suppressed while maintaining a high frame rate and a high dynamic range. In the example described above, the enable period (times t15 to t17) of the counter 112 is the conversion period of the A/D conversion circuit 114. When the time period (times t15 to t19) during which the ramp signal changes with time is shorter than the enable period of the counter 112, the period during which the ramp signal changes with time may be the conversion period of the A/D conversion circuit 114. The operations at time t20, time t21 and time t22 may be performed in any order, or some or all of them may be performed simultaneously. The operation at time 13 and the operation at time t14 may be performed in reverse or simultaneously.

Figure 4:
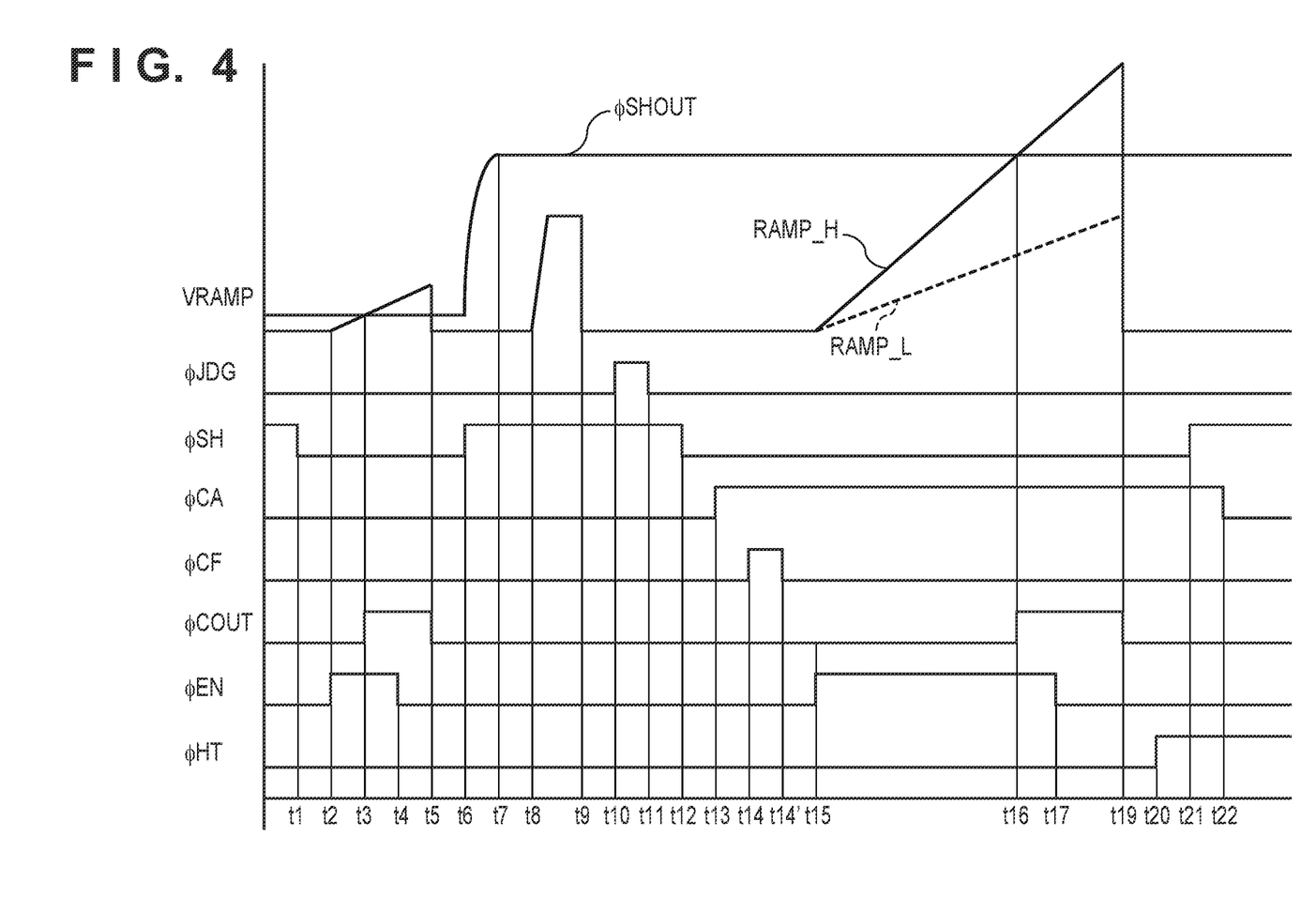
FIG. 4 is a diagram illustrating exemplary operations performed by another imaging device of some embodiments.

A modification example of the operation of the imaging device 100 is described below with reference to FIG. 4. Descriptions for components similar to those described in FIG. 3 are omitted to avoid redundancy, and the differences are described below. In the example operation of FIG. 4, the timing generating circuit 110 lowers the control signal φCF at time t14' between time t14 and time t15 instead of fall the control signal φCF at time t18. In other words, the timing generating circuit 110 performs the rise (time t14) and the fall (time t14') of the control signal φCF before the conversion period (times t15 to t17) of the pixel signal.

Figure 5:
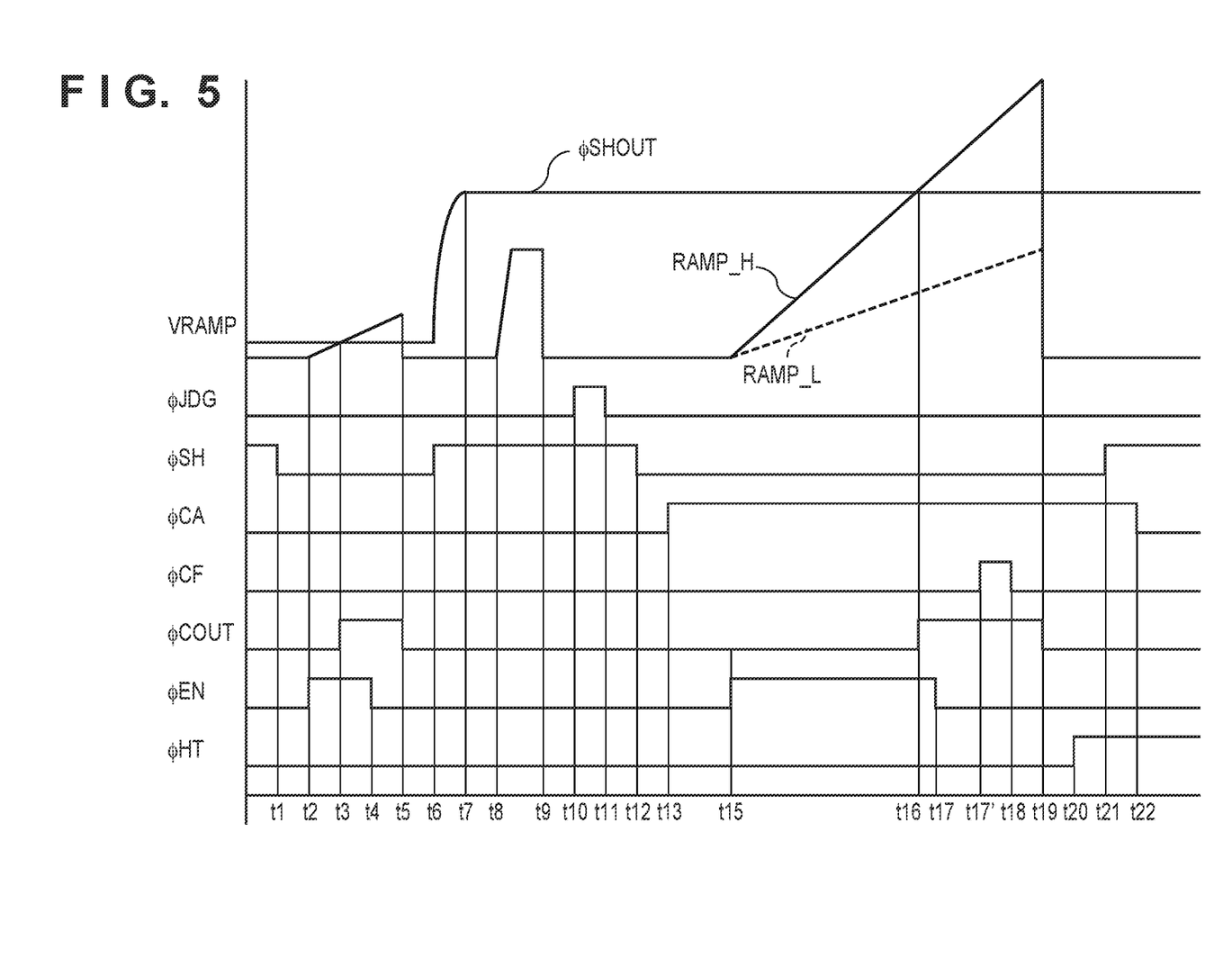
FIG. 5 is a diagram illustrating exemplary operations performed by another imaging device of some embodiments.

Another modification example of the operation of the imaging device 100 is described below with reference to FIG. 5. Descriptions for components similar to those described in FIG. 3 are omitted to avoid redundancy, and the differences are described below. In the example operation of FIG. 5, instead of causing the rise of the control signal φCF at time t14, the timing generating circuit 110 raises the control signal φCF at time t17' between time t17 and time t18. In other words, the timing generating circuit 110 performs the rise (time t17') and the fall (time t18) of the control signal φCF after the conversion period (times t15 to t17) of the pixel signal.

Yet another modification example of the embodiments described above is described below. The modification described below is applicable to any embodiment. In the embodiments described above, signals are read from pixels in each column of the pixel array 101 in one direction (in FIG. 1, downward). Alternatively, a signal may be read from some pixels (e.g., pixels in odd rows) of each column of the pixel array 101 in one direction (e.g., upward) and read from other pixels (e.g., pixels in even rows) in another direction (e.g., downward). The signals read in respective directions are amplified by respective amplification circuits 103, and then are subjected to the succeeding process.

Figure 7:
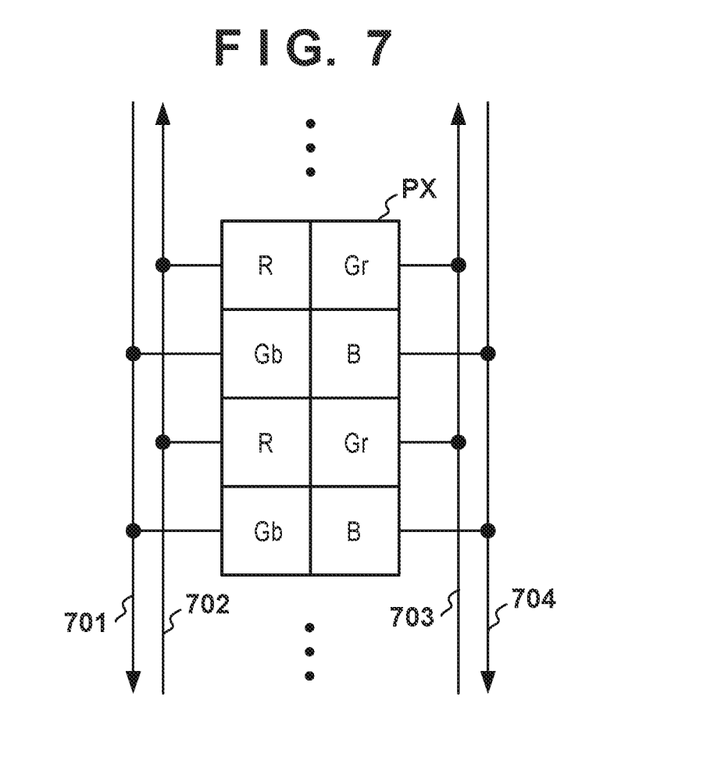
FIG. 7 is a diagram illustrating an exemplary arrangement of signal lines of some embodiments.

For example, it is assumed that the pixel circuits PX of the pixel array 101 are arranged in a Bayer arrangement as illustrated in FIG. 7. In the Bayer arrangement, green, blue and red are disposed at a ratio of 2:1:1. In FIG. 7, a pixel where a red color filter is disposed is represented by a pixel R, and a pixel where a blue color filter is disposed is represented by a pixel B. In addition, a pixel where a green color filter is disposed adjacent to the pixel R is represented by a pixel Gr, and a pixel where a green color filter is disposed adjacent to the pixel B is represented by a pixel Gb.

A pixel signal generated in the pixel Gb is read through a signal line 701 to an amplification circuit located below the pixel array. A pixel signal generated in the pixel R is read through a signal line 702 to an amplification circuit located above the pixel array. A pixel signal generated in the pixel Gr is read through a signal line 703 to an amplification circuit located above the pixel array. A pixel signal generated in the pixel B is read through a signal line 704 to an amplification circuit located below the pixel array.

The vertical scanning circuit 102 simultaneously reads the signals from the pixels of two adjacent rows. In other words, the signals are simultaneously read from pixel R, pixel Gr, pixel Gb, and pixel B. A pair of pixels R and Gr are read upward, and a pair of pixels B and Gb are read downward.

For example, in the case where the subject is a light source of white light and the like, the color filters of the pixels Gr and Gb are more sensitive than the color filters of the pixels B and R, and as such brightness determination of the pixels Gr and Gb is performed at a time after that of the pixels B and R. With the above-mentioned configuration, the pixel Gr and the pixel Gb are read in different directions, and the pixel B and the pixel R are read in different directions. Thus, the time at which the luminance determination is performed can be distributed, and the effects of crosstalk noise on the common wiring can be made uniform in the upper and lower amplification circuits. Accordingly, degradation in image quality can be suppressed with the connection configuration illustrated in FIG. 7.

Below, as an exemplary application of the imaging device according to the embodiments, a camera in which the imaging device is incorporated is described. The concept of the camera includes not only devices that are primarily intended for image capturing, but also devices that supplementally include an image capturing function (such as personal computers and mobile terminals). The camera includes the imaging device according to the present invention, which is illustrated as the embodiments described above, and a signal processing unit that processes information based on a signal output from the imaging device. The processing unit may include a processor that processes digital signals, which are image data. The processor may calculate a defocus amount on the basis of a signal from a pixel having a focus detection function of the imaging device to perform processing of controlling a focus adjustment of an imaging lens on the basis of the calculation. An A/D converter for generating the above-mentioned image data may be provided in the imaging device, or may be provided separately from the imaging device. For example, a so-called stacked sensor may also be employed in which a first substrate including the pixel array 101 and a second substrate including a circuit other than the pixel array 101, such as the amplification circuit 103, the sample and hold circuit 104 and the A/D conversion circuit 114, are stacked. In this example, the second substrate is a semiconductor device for lamination, and the effect of improving image quality can be achieved only with the second substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-111247, filed Jun. 11, 2018 which is hereby incorporated by reference herein in its entirety.

What is claimed is:

1. An imaging device comprising:
   a pixel circuit configured to generate an analog signal in accordance with a quantity of incident light;
   an amplification circuit including a feedback capacitor and a switching element for resetting the feedback capacitor, the amplification circuit being configured to amplify the analog signal generated in the pixel circuit;
   a sample and hold circuit configured to perform sampling and holding of the analog signal amplified by the amplification circuit;
   an A/D conversion circuit configured to convert the analog signal held in the sample and hold circuit to a digital signal;
   a memory circuit configured to store the digital signal;
   a reading circuit configured to read the digital signal stored in the memory circuit; and
   a control circuit configured to generate a control signal for controlling on/off of the switching element,
   wherein the control circuit performs a rise and a fall of the control signal such that the rise and the fall do not overlap a conversion period of the analog signal by the A/D conversion circuit and do not overlap a reading period of the digital signal by the reading circuit, when the switching element is off during a sampling period of the analog signal, and
   wherein the control circuit performs the rise of the control signal before the conversion period and performs the fall of the control signal after the conversion period and before the reading period, when the switching element is off during the sampling period of the analog signal.

2. The imaging device according to claim 1, wherein the A/D conversion circuit performs A/D conversion using a reference signal and a counter; and the conversion period of the A/D conversion circuit is an enable period of the counter.

3. The imaging device according to claim 1, wherein the A/D conversion circuit performs A/D conversion using a reference signal and a counter; and the conversion period of the A/D conversion circuit is a period in which the reference signal changes with time.

4. A camera comprising:
   the imaging device according to claim 1; and
   a signal processing unit configured to process a signal obtained by the imaging device.

5. An imaging device comprising:
   a pixel circuit configured to generate an analog signal in accordance with a quantity of incident light;
   an amplification circuit including a feedback capacitor and a switching element for resetting the feedback capacitor, the amplification circuit being configured to amplify the analog signal generated in the pixel circuit;
   a sample and hold circuit configured to perform sampling and holding of the analog signal amplified by the amplification circuit;
   an A/D conversion circuit configured to convert the analog signal held in the sample and hold circuit to a digital signal;
   a memory circuit configured to store the digital signal;
   a reading circuit configured to read the digital signal stored in the memory circuit; and
   a control circuit configured to generate a control signal for controlling on/off of the switching element,
   wherein the control circuit performs a rise and a fall of the control signal such that the rise and the fall do not overlap a conversion period of the analog signal by the A/D conversion circuit and do not overlap a reading period of the digital signal by the reading circuit, when the switching element is off during a sampling period of the analog signal, and
   wherein the control circuit performs the rise and the fall of the control signal after the conversion period and before the reading period when the switching element is off during the sampling period of the analog signal.

6. A camera comprising:
   the imaging device according to claim 5; and
   a signal processing unit configured to process a signal obtained by the imaging device.

7. A semiconductor device for lamination comprising:
   an amplification circuit including a feedback capacitor and a switching element for resetting the feedback capacitor, the amplification circuit being configured to amplify an analog signal generated in response to a photoelectric conversion;

a sample and hold circuit configured to perform sampling and holding of the analog signal amplified by the amplification circuit;

an A/D conversion circuit configured to convert the analog signal held in the sample and hold circuit to a digital signal;

a memory circuit configured to store the digital signal;

a reading circuit configured to read the digital signal stored in the memory circuit; and a control circuit configured to generate a control signal for controlling on/off of the switching element, wherein the control circuit performs a rise and a fall of the control signal such that the rise and the fall do not overlap each of a conversion period of the analog signal by the A/D conversion circuit and a reading period of the digital signal by the reading circuit when the switching element is off during a sampling period of the analog signal, and wherein the control circuit performs the rise of the control signal before the conversion period and performs the fall of the control signal after the conversion period and before the reading period, when the switching element is off during the sampling period of the analog signal.

8. A semiconductor device for lamination comprising:

an amplification circuit including a feedback capacitor and a switching element for resetting the feedback capacitor, the amplification circuit being configured to amplify an analog signal generated in response to a photoelectric conversion;

a sample and hold circuit configured to perform sampling and holding of the analog signal amplified by the amplification circuit;

an A/D conversion circuit configured to convert the analog signal held in the sample and hold circuit to a digital signal;

a memory circuit configured to store the digital signal;

a reading circuit configured to read the digital signal stored in the memory circuit; and a control circuit configured to generate a control signal for controlling on/off of the switching element, wherein the control circuit performs a rise and a fall of the control signal such that the rise and the fall do not overlap each of a conversion period of the analog signal by the A/D conversion circuit and a reading period of the digital signal by the reading circuit when the switching element is off during a sampling period of the analog signal, and wherein the control circuit performs the rise and the fall of the control signal after the conversion period and before the reading period when the switching element is off during the sampling period of the analog signal.

* * * * *